(12) United States Patent
Thompson et al.

(10) Patent No.: US 6,483,972 B1
(45) Date of Patent: Nov. 19, 2002

(54) EDGE-BONDED SPLITTABLE OPTICAL-FIBER RIBBON

(75) Inventors: Justin Thompson, Huntersville, NC (US); Kevin Scott Paschal, Claremont, NC (US)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/544,553

(22) Filed: Apr. 6, 2000

(51) Int. Cl.[7] ................................................. G02B 6/44
(52) U.S. Cl. ......................................................... 385/114
(58) Field of Search ........................................ 385/114

(56) References Cited

U.S. PATENT DOCUMENTS

| | | | |
|---|---|---|---|
| 4,666,244 A | 5/1987 | Van der Velde et al. | 350/96.23 |
| 4,900,126 A | 2/1990 | Jackson et al. | 350/46.23 |
| 4,930,860 A | 6/1990 | Tansey et al. | 350/96.23 |
| 5,369,720 A | 11/1994 | Parry et al. | 385/114 |
| 5,416,880 A | 5/1995 | Edwards et al. | 385/128 |
| 5,457,762 A | 10/1995 | Lochkovic et al. | 385/114 |
| 5,621,838 A | 4/1997 | Nomura et al. | 385/100 |
| 5,809,195 A | 9/1998 | Brown et al. | 385/114 |
| 5,908,873 A | 6/1999 | Shustack | 522/39 |
| 5,933,559 A | 8/1999 | Petisce | 385/114 |
| 5,956,446 A * | 9/1999 | Benzel | 385/114 |
| 6,028,976 A * | 2/2000 | Sato et al. | 385/114 |
| 6,253,013 B1 * | 6/2001 | Lochkovic et al. | 385/114 |

FOREIGN PATENT DOCUMENTS

WO    WO 95/09376    4/1995

OTHER PUBLICATIONS

Patent Abstracts of Japan, Publication No. 0–9197211, dated Jul. 31, 1997.
Patent Abstracts of Japan, Publication No. 01138518, dated May 31, 1989.
Patent Abstracts of Japan, Publication No. 01150106, dated Jun. 13, 1989.
Patent Abstracts of Japan, Publication No. 02190805, dated Jul. 26, 1990.
Patent Abstracts of Japan, Publication No. 05019150, dated Jan. 29, 1993.
Patent Abstracts of Japan, Publication No. 01138519, dated May 31, 1989.
Proceedings of 47th International Wire and Cable Symposium, Sponsored by International Wire and Cable Symposium, Inc. Philadelphia, PA, 11/98.
Proceedings of 48th International Wire and Cable Symposium, Sponsored by International Wire and Cable Symposium, Inc., Atlantic City, NJ, 11/99.

* cited by examiner

*Primary Examiner*—Akm E. Ullah
*Assistant Examiner*—Jerry T. Rahll
(74) *Attorney, Agent, or Firm*—Sughrue Mion, PLLC

(57) ABSTRACT

A splittable optical-fiber ribbon product that includes at least two sub-unit ribbons each having a plurality of optical fibers encapsulated in a matrix material. The sub-units are disposed adjacent to one another, and are attached to one another by an adhesion matrix material which does not fully encapsulate both of the sub-units.

19 Claims, 3 Drawing Sheets

EDGE-BONDED SPLITTABLE OPTICAL-FIBER RIBBON

BACKGROUND

1. Field of the Invention

The present invention is directed to splittable optical-fiber ribbon products and, more particularly, to optical-fiber ribbon products containing a plurality of sub-unit ribbons that may be separated into fully functional, independent optical-fiber ribbons.

2. Related Art

In the related art, sub-unit ribbons include a plurality of optical fibers encapsulated in a matrix material. A plurality of sub-unit ribbons are then fully encapsulated together to form a splittable optical-fiber ribbon product. Although any number of sub-unit ribbons may be encapsulated together, only two sub-unit ribbons are shown in FIG. 6. As shown in FIG. 6, a first subunit ribbon 10' includes a plurality of optical fibers 1' which are encapsulated by matrix material 2'. Similarly, a second sub-unit ribbon 20' includes a plurality of optical fibers 1' which are encapsulated by matrix material 2'. The first and second sub-unit ribbons 10', 20' are then fully encapsulated by encapsulation material 30' to form a splittable optical-fiber ribbon product.

A continuing problem in the development of optical-fiber cables is that of providing a high fiber count in a small cable volume in an effort to reduce costs. The related art splittable optical-fiber ribbon product suffers disadvantages in this regard. First, the encapsulation material 30' increases the width and thickness of the splittable optical-fiber ribbon product, thereby allowing a limited number of optical fibers 1' to occupy a given volume. The width of the splittable optical-fiber ribbon product is the widths $w_1$ and $w_2$ of the first and second sub-unit ribbons 10' and 20', plus twice a hinge thickness th of encapsulation material 30', which hinge thickness th exists on each side. Therefore, the width of the splittable optical-fiber ribbon product is increased by at least twice the hinge thickness $t_h$ over the width of an optical-fiber ribbon made without sub-units and having the same number of fibers as the two subunits 10' and 20' together. Similarly, the encapsulation material 30' is present on the top and bottom of the sub-unit ribbons 10', 20' as an overcoat having thickness $t_o$. Therefore, the thickness of the splittable optical-fiber ribbon product is thicker than either sub-unit by an amount that is twice the overcoat thickness $t_o$.

Further, the individual sub-units may be thicker and wider after being separated or split from the splittable ribbon than before they were joined together. Therefore, the remaining matrix material on the separated sub-units must be removed, which causes additional time delays when it is desired to use the sub-units as individual ribbons, as in connectors and other equipment, for example, after they are separated from the splittable optical-fiber ribbon product.

This increased width and thickness results in a lower packing density, i.e., a smaller fiber count within a particular volume for the splittable optical-fiber ribbon product as well as for the individual sub-units after they are split from the ribbon product.

In order to increase packing density, one related art solution involves using the encapsulation material to provide hinge coverage in the splittable optical-fiber ribbon product. That is, in this type of related art product, the individual sub-units do not have a matrix material which completely encapsulates the optical fibers. Instead, the optical-fibers are completely encapsulated only after the encapsulation material is applied. This arrangement thus attempts to increase packing density by eliminating the sub-units' hinge thicknesses. When the sub-units are split, however, there is a distinct danger of having one of the fibers on either end of the sub-unit break out of the sub-unit package. This danger is especially acute on the end of the sub-unit that was previously adhered to another sub-unit because the sub-unit hinge is too thin to have the strength necessary to withstand the forces involved in the process of fracturing the encapsulation material that binds it to the adjacent sub-unit.

Another problem related to fully encapsulating the sub-unit ribbons is high cost in both materials and production of splittable optical-fiber ribbon products. That is, the encapsulation material 30' can be quite expensive and, therefore, the more that is used, the more expensive the end product becomes. Further, the encapsulation material is typically cured using ultra-violet (UV) or other radiation. And the amount of energy required to cure the encapsulation material 30' is proportional to the amount of material used.

Yet another problem in the optical-fiber industry is that of easily and quickly accessing the optical fibers within a splittable optical-fiber ribbon product. That is, for installation, service and maintenance purposes, it often becomes necessary to perform splicing and termination operations on individual optical-fibers within a splittable optical-fiber ribbon product. In order to access the individual optical-fibers, a peeling process is typically used. The peeling process must leave the optical fibers with their individual coatings—including color coatings—intact, yet peel away all of the sub-unit's matrix material that binds them together. The sub-units of splittable ribbon products are easily split away from the combined optical-fiber ribbon product to facilitate access in the field. However, difficulty arises in that both an encapsulation material and a sub-unit matrix material must then be peeled off in order to access individual fibers. This situation will be described with reference to FIGS. 7 and 8.

FIG. 7 shows a first sub-unit ribbon 10' after it has been split apart from the combined optical-fiber ribbon product shown in FIG. 6. As shown in FIG. 7, the sub-unit 10' and the optical fibers 1' are still encapsulated within encapsulation material 30' as well as within matrix material 2'. Therefore, a two-step peeling process often must be performed to access the optical fibers 1'. That is, a first peeling process performed on the split-off sub-unit 10' shown in FIG. 7 typically results only in removal of the encapsulation material 30' leaving the sub-unit 10' as shown in FIG. 8. A second peeling process must then be performed on the split-off sub-unit 10' as shown in FIG. 8 to remove the matrix material 2' so that the optical-fibers 1' can be accessed.

Performing two peeling processes to access the optical fibers 1' adds to installation time for workers in the field who are using such ribbons. When applied to high fiber-count installations, this added installation time can become quite sizable.

SUMMARY OF THE INVENTION

It is an object of the present invention to overcome the drawbacks of the related art. More particularly, it is an object of the present invention to provide a lower cost splittable optical-fiber ribbon product than that available in the related art, and one which also reduces external dimensions in order to increase its packing density, i.e., the space required to pack a stack of ribbons in a cable or tube. Reducing external dimensions reduces cost and increases packing density, thereby allowing a high fiber count to be provided in a small cable volume.

It is another object of the present invention to reduce the risk of fiber breakout in splittable optical-fiber ribbon products.

It is a further object of the invention to provide a splittable optical-fiber ribbon product in which individual optical fibers can be accessed easily and quickly. More particularly, it is an object of the present invention to provide a splittable optical-fiber ribbon product whose optical fibers can be accessed with only one peeling process, thereby reducing installation time in the field.

The present invention achieves the above and other objects and advantages by not fully encapsulating a splittable optical-fiber ribbon product's sub-unit ribbons. Instead, adhesion matrix material, bonding material, or adhesive is applied only to the area in the gap between sub-units of a splittable optical-fiber ribbon product, and the sub-units themselves include a matrix material which encapsulates the individual optical fibers. The adhesion properties of the adhesion matrix material are such that when cured, it adheres well to all of the sub-units and, thus, effectively creates one ribbon. It is important to emphasize that the bond between the adhesion matrix material and the sub-unit matrix material must be sufficiently strong so that outward normal forces applied to the external surface of the adhesion matrix material are transferred to the sub-unit matrix material. If this bond is sufficiently stronger than the similar bond existing between the sub-unit ribbon matrix and the individual fibers' secondary coating, then the outward normal forces applied by the peeling process will cause a break in to occur at the interface between the sub-unit matrix and the individual fibers, rather than between the sub-unit matrix and the adhesion matrix material. Additionally, the adhesion matrix material is sufficiently brittle so that the final product can easily be split into respective sub-units, yet is sufficiently tough that the finished product does not break apart during the cabling process. The combination of the edge-bonded—not fully encapsulated—design and the choice of adhesion matrix material for optimized adhesion properties allows for the achievement of the desired final ribbon properties. This is because normal manufacturing process variations may allow for the adhesion matrix material to be applied in locations other than in the interstitial gap between sub-units. For example, if the adhesion matrix material is present on the top surface of ribbon, due to normal production variations, the transfer of normal forces on this adhesion matrix layer to the sub-unit matrix layer will improve the peel performance and allow the one step peel process to be accomplished.

The adhesion matrix material in the present invention may be any UV or other radiation-curable acrylate, as is typically used in the optical-fiber industry. Examples of the adhesion matrix material according to the present invention are DSM-C9-32 available from DSM Desotech Incorporated, Borden 255 UV-curable acrylate, or any minor variation of these or similar materials. It is understood that the adhesion matrix material must be of similar composition as the sub-unit matrix material, however, the minor variations possible might include formulation changes for promoting adhesion, for altering the brittleness, or any other material property variation deemed desirable.

Although it is preferable to use an adhesion matrix material which is the same as that of the sub-unit matrix material, different materials may by used for each. However, the adhesion matrix material must be sufficiently similar to the sub-unit matrix material so that it forms a strong enough bond to hold the sub-units together during processing and handling. Further, the adhesion matrix material may be a color different from that of the sub-unit ribbons' matrix material so that the sub-units can be easily identified and, therefore, easily split-off from the splittable optical-fiber ribbon product.

A negligible thickness of the adhesion matrix material may, or may not, exist across the external surfaces of the sub-unit, as on the top, bottom and hinge ends of the sub-units. However, the only appreciable buildup of this material is in the interstitial gap between the sub-units. The sub-units themselves can, therefore, be manufactured such that their dimensions are identical, or nearly identical, to the dimensions of any standard ribbon of similar fiber count that is manufactured for independent use, i.e., a ribbon that is not of a splittable-type.

Because a splittable optical-fiber ribbon product's sub-unit ribbons are not fully encapsulated by encapsulation material, the splittable optical-fiber ribbon product of the present invention allows a tighter packing density than a fully encapsulated ribbon. This means that the same number of ribbons, with identical fiber counts, can be packaged in a tube or cable having a smaller diameter than that made with the conventional splittable optical-fiber ribbon products. Further, the sub-unit ribbons have a tighter packing density after they have been separated from the splittable optical-fiber ribbon product.

Additionally, using sub-units that fully encapsulate their optical fibers, sub-unit geometrical independence is maintained and the adhesion matrix material is used merely to adhere sub-units together. Such allows for a reduced risk of having end fibers break out during or after a sub-unit has been split apart from the splittable optical-fiber ribbon product. Such also allows the sub unit ribbons easily to be used in standard connectors or other apparatuses designed for independent-use ribbons, i.e., ones which are not of a splittable-type and, therefore, do not have the additional thicknesses th and to.

Further, because a splittable optical-fiber ribbon product's sub-unit ribbons are not fully encapsulated by encapsulation material, a substantially smaller volume of a rather expensive material is required, and the sub-units are more easily separated into independent, fully functioning, sub-units when it is desired to do so.

Moreover, according to the present invention, because a splittable optical-fiber ribbon product's sub-unit ribbons are not fully encapsulated by encapsulation material, a peeling process to access individual fibers is simplified and shortened. That is, only one step is necessary to peel the splittable optical-fiber ribbon product of the present invention, thereby reducing installation, service and maintenance time.

BRIEF DESCRIPTION OF THE DRAWINGS

The above and other objects and advantages of the present invention will become more apparent by describing in detail preferred embodiments thereof with reference to the accompanying drawings, wherein like reference numerals designate like or corresponding parts throughout the several views, and wherein.

DETAILED DESCRIPTION OF THE INVENTION

Preferred embodiments of the present invention will now be described with reference to FIGS. 1–3, wherein sub-unit ribbons are attached to one another so as to maximize the packing density of the ribbon, so as to allow the sub-units easily to be split from one another, and so as to allow the optical fibers therein easily to be accessed while at the same time reducing the cost of the overall splittable optical-fiber ribbon product.

Figure 1:
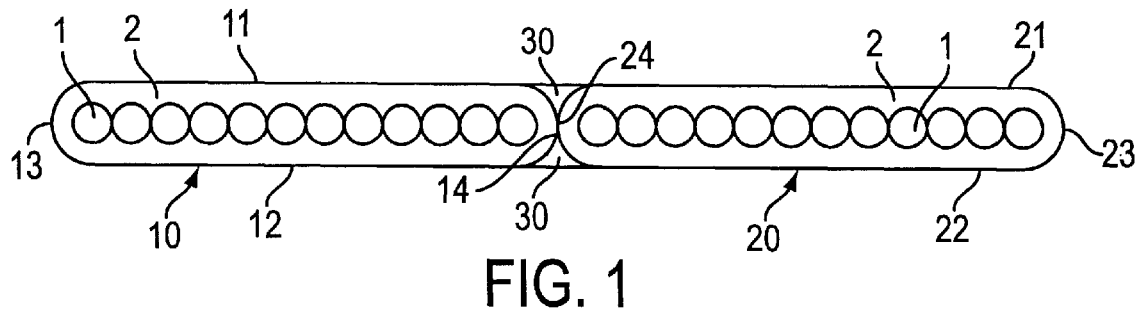
FIG. 1 is a schematic cross-section of a splittable optical-fiber ribbon product according to a first embodiment of the present invention.

A first embodiment of the present invention is shown in FIG. 1. A splittable optical-fiber ribbon product according to this embodiment includes a first sub-unit ribbon 10 and a second sub-unit ribbon 20. The first sub-unit ribbon 10 includes a top surface 11, a bottom surface 12, a first end 13, and a second end 14. Similarly, the second sub-unit ribbon 20 includes a top surface 21, a bottom surface 22, a first end 23, and a second end 24. Each of the sub-unit ribbons 10, 20 includes a plurality of optical fibers 1, arranged substantially in a plane, and encapsulated by a matrix material 2. Each sub-unit may include any number, and any type, of optical fibers 1, although only twelve are shown. Additionally, the arrangement of optical fibers may vary slightly from perfectly planar as shown in the Figures. The amount of variation should, however, be within the tolerances set in the industry, and less variation is preferred. Further, the splittable optical-fiber ribbon product may contain any number of sub-units, although only two are shown for clarity.

The second ends 14, 24 of the sub-unit ribbons 10, 20 are attached to one another by an encapsulation, bonding, or adhesive matrix, material 30 (hereinafter simply referred to as adhesion matrix material 30) which is disposed so as not to fully encapsulate the sub-unit ribbons 10, 20. That is, the adhesion matrix material 30 is mainly present at the interstitial gap—on both the top and bottom of the ribbon—formed by the abutting sub-units 10, 20. Although it is preferable to have the sub-units abut one another, as shown, they may be separated by a thin layer of the adhesion matrix material 30. Further, it is preferable to have the adhesion matrix material 30 even with the top surfaces 11, 21 of the sub-units, thereby presenting a smooth surface for the splittable optical-fiber ribbon product. Similarly, it is preferable to dispose the adhesion matrix material 30 so that it is even with the bottom surfaces 12, 22 of the sub-units.

Because the adhesion matrix material 30 is not present on the top 11, 21 or bottom 12, 22 surfaces, the overall thickness of the splittable optical-fiber ribbon product is reduced as compared to that of the related art, thereby increasing packing density. The packing density is further increased due to the absence of adhesion matrix material 30 from on the ends 13, 23 of the sub-unit ribbons 10, 20.

Further, by having the adhesion matrix material 30 present only at the interstitial gap between the sub-units 10, 20, the top surfaces 11, 21 of the subunit ribbons 10, 20 form the top surface of the overall splittable optical-fiber ribbon product. Similarly, the bottom surfaces 12, 22 of the sub-unit ribbons 10, 20 form the bottom surface of the overall splittable optical-fiber ribbon product. Therefore, the optical fibers 1 easily and quickly can be accessed merely by peeling the matrix material 2 of the sub-unit ribbons 10, 20. That is, only one peeling process-that necessary to remove the matrix material 2—s required to access the optical fibers 1. And the optical fibers 1 may be accessed from either the top or the bottom of the ribbon product.

Figure 2:
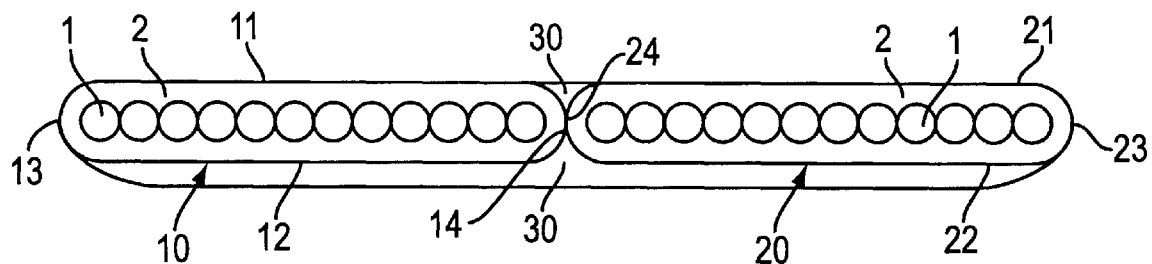
FIG. 2 is a schematic cross-section of a splittable optical-fiber ribbon product according to a second embodiment of the present invention.

A second embodiment of the present invention is shown in FIG. 2. Reference numerals similar to those in FIG. 1 are used to designate the same or similar elements. The sub-unit ribbons 10, 20 in the second embodiment are identical to those of the first embodiment and, therefore, a detailed description thereof is omitted. In the second embodiment, the adhesion matrix material 30 is present at the interstitial gap between the sub-unit ribbons 10, 20, and also is present on the bottom surfaces 12, 22. But the sub-unit ribbons 10, 20 are still not fully encapsulated by the adhesion matrix material 30. That is, the top surfaces 11, 21, as well as the first ends 13, 23 of the sub-unit ribbons 10, 20 are not covered by adhesion matrix material 30. Because the sub-unit ribbons 10, 20 are not completely covered by the adhesion matrix material 30, the above-described advantages also accrue to this embodiment. More specifically, the optical fibers 1 are easily and quickly accessible by a one-step peeling process performed on the top surfaces 11, 21. Additionally, less adhesion matrix material 30 is necessary than the amount required by the related art splittable optical-fiber ribbon product. Moreover, the packing density of the second embodiment is increased over that of the related art splittable optical-fiber ribbon product.

Figure 3:
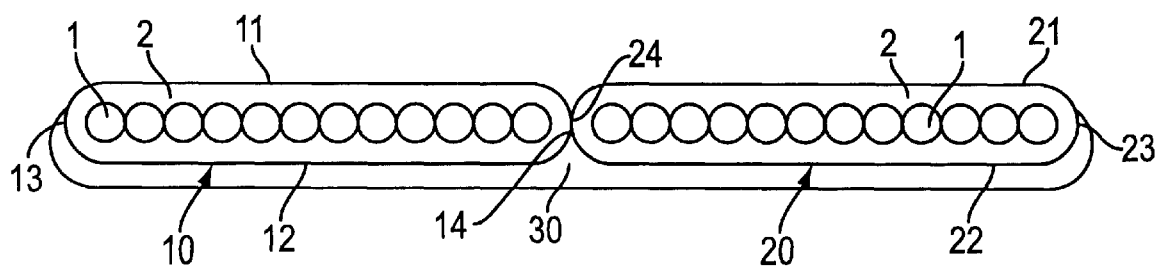
FIG. 3 is a schematic cross-section of a splittable optical-fiber ribbon product according to a third embodiment of the present invention.

A third embodiment of the present invention is shown in FIG. 3. Reference numerals similar to those in FIG. 1 are used to designate the same or similar elements. The sub-unit ribbons 10, 20 in the third embodiment are identical to those of the first embodiment and, therefore, a detailed description thereof is omitted. In the third embodiment, the adhesion matrix material 30 is present at the interstitial gap between the sub-unit ribbons 10, 20, is present on the bottom surfaces 12, 22, and is present on the first ends 13, 23. But the sub-unit ribbons are still not fully encapsulated by the adhesion matrix material 30. That is, the top surfaces 11, 21 of the sub-unit ribbons 10, 20 are not covered by adhesion matrix material 30. Because the sub-unit ribbons 10, 20 are not completely covered by the adhesion matrix material 30, the above-described advantages also accrue to this embodiment. More specifically, the optical fibers 1 are easily and quickly accessible by a one-step peeling process performed on the top surfaces 11, 21. Additionally, less adhesion matrix material 30 is necessary than the amount required by the related art splittable optical-fiber ribbon product. Moreover, the packing density of the second embodiment is increased over that of the related art splittable optical-fiber ribbon product.

Further, in this embodiment, adhesion matrix material 30 is applied only to the bottom of the interstitial gap between the sub-unit ribbons 10, 20. That is, there is no application of adhesion matrix material 30 to the top of the interstitial gap between the sub-unit ribbons. This gives a further advantage in that the adhesion matrix material need be applied from only one side of the splittable optical-fiber ribbon product and the sub-unit ribbons are more easily splittable when it is desired to do so.

Figure 4:
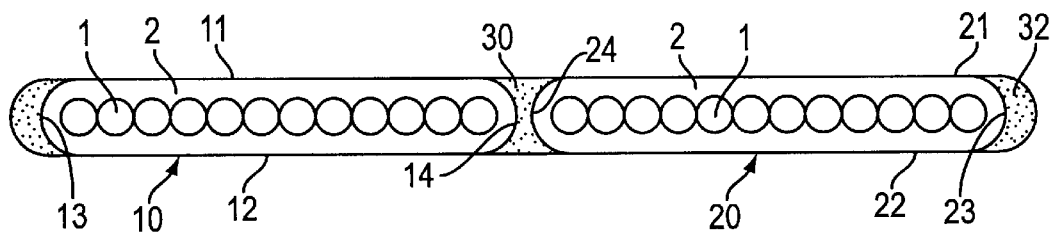
FIG. 4 is a schematic cross-section of a splittable optical-fiber ribbon product according to a fourth embodiment of the present invention.
Figure 5:
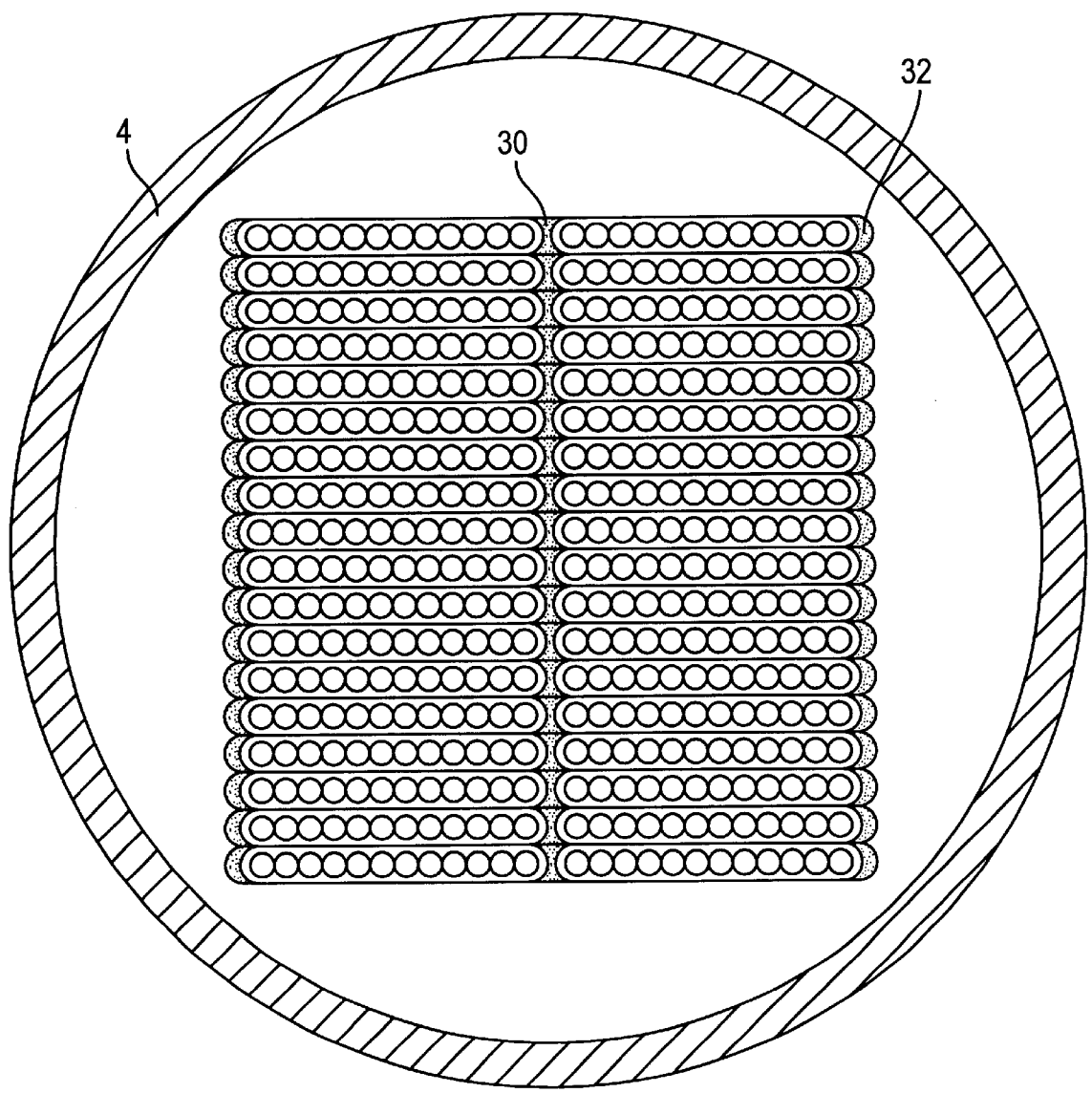
FIG. 5 is a schematic cross-section of a plurality of splittable optical-fiber ribbon products, according to the fourth embodiment, enclosed within a tube for use in optical-fiber cable.
Figure 6:
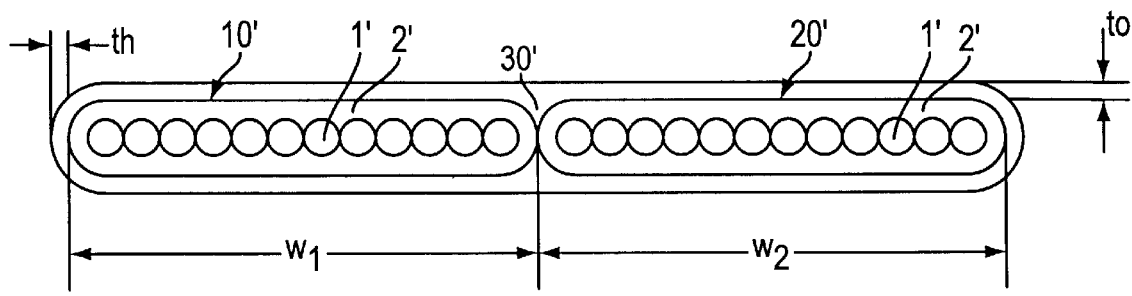
FIG. 6 is a schematic cross-section of a splittable optical-fiber ribbon product according to the related art.
Figure 7:
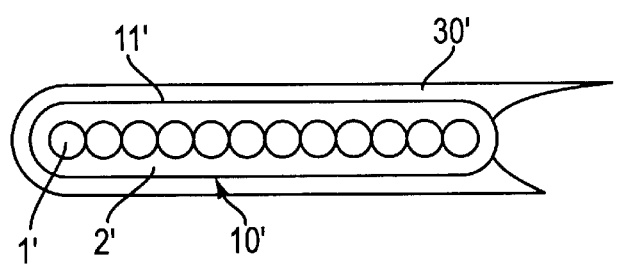
FIG. 7 is a schematic cross-section of a splittable optical-fiber ribbon product, according to the related art, after a sub-unit splitting process.
Figure 8:
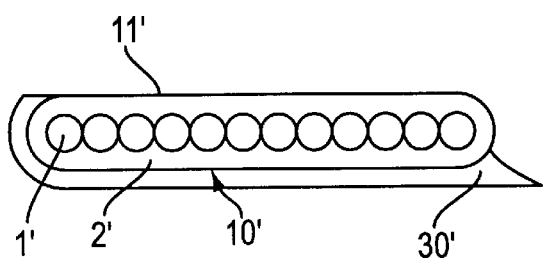
FIG. 8 is a schematic cross-section of a splittable optical-fiber ribbon product, according to the related art, after a first peeling process.

A fourth embodiment of the present invention is shown in FIG. 4. Reference numerals similar to those in FIG. 1 are used to designate the same or similar elements. The sub-unit ribbons 10, 20 in the second embodiment are identical to those of the first embodiment and, therefore, a detailed description thereof is omitted. In the fourth embodiment, the adhesion matrix material 30 is present only at the interstitial gap between the sub-unit ribbons 10, 20. Also, an added hinge thickness 32 is present on the first ends 13, 23 of each the first and second sub-unit ribbons 10, 20, respectively. The added hinge thickness 32 is preferably the same material as the adhesion matrix material 30, but may be a different material. The added hinge thickness 32 provides added protection to the fibers 1 on the first ends 12, 23 of the sub unit-ribbons 10, 20 when they are placed in a tube 4 to form a cable, as shown in FIG. 5. That is, the ends 12, 23 are more likely to come into contact with the tube 4 and, therefore, are protected by the added hinge thickness 32. But even in this embodiment, the sub-unit ribbons 10, 20 are still not fully encapsulated by the adhesion matrix material 30 and/or the added hinge thickness 32. That is, the top surfaces 11, 21 of the sub-unit ribbons 10, 20 are not covered by adhesion matrix material 30 or by the added hinge thickness 32. Because the sub-unit ribbons 10, 20 are not completely covered by the adhesion matrix material 30 and/or by the added hinge thickness 32, the above-described advantages also accrue to this embodiment. More specifically, the optical fibers 1 are easily and quickly accessible by a one-step peeling process performed on the top surfaces 11, 21. Additionally, less adhesion matrix material 30 is necessary than the amount required for the related art splittable optical-fiber ribbon product. Moreover, the packing density of the fourth embodiment is increased over that of the related art splittable optical-fiber ribbon product, albeit to a lesser extent than the first embodiment due to the added hinge thickness 32.

In the above-described embodiments, an adhesion matrix that is of a color different from that of the sub-unit matrix material(s) may be used to provide additional identification of the particular sub-unit grouping. For instance, in many cables containing splittable ribbons there will be more than one splittable ribbon containing identically marked or colored sub-units (i.e. two 24-fiber splittable ribbons each containing a blue sub-unit and an orange sub-unit). By using a colored adhesion matrix layer, one side of the splittable ribbon would be differently colored. Similar sub-unit groupings may be adhered with different colors of adhesion matrix. That is, a 24-fiber ribbon with a blue sub-unit, an orange sub-unit and white adhesion matrix is visibly different than a 24-fiber ribbon with a blue sub-unit, an orange sub-unit and black adhesion matrix. In the second and third embodiments, this coloration of the adhesion matrix would also provide a visible identifier as to which side of the splittable ribbon has the adhesion matrix material coating on it and, therefore, which side of the splittable ribbon should be used during the peeling process.

Throughout the specification, the terms top, bottom, and end have been used for convenience only, and refer to the orientation of the ribbon product as shown in the Figures. Of course, the ribbon product may be oriented differently from that shown in the Figures without departing from the spirit and scope of the invention. Additionally, it is contemplated that numerous modifications may be made to the edge-bonded splittable optical-fiber ribbon of the present invention without departing from the spirit and scope of the invention as defined in the following claims.

We claim:

1. A splittable optical-fiber ribbon product comprising:
   a first sub-unit comprising a first plurality of optical fibers arranged substantially in a plane and encapsulated in a first matrix material;
   a second sub-unit comprising a second plurality of optical fibers arranged substantially in a plane and encapsulated in a second matrix material;
   said first sub-unit and said second sub-unit being disposed adjacent to one another so that said first plurality of optical fibers and said second plurality of optical fibers lie substantially in one plane;
   bonding material disposed on said first sub-unit and on said second sub-unit so as not to fully encapsulate both of said first sub-unit and said second sub-unit,
   wherein each of said first and second sub-units includes a first end and a second end disposed in the optical-fiber plane so that said second ends of said first and second sub-units are adjacent one another, and said bonding material is disposed only between said second ends; and
   further comprising added hinge thicknesses only on said first ends of said first and second sub-units.

2. A splittable optical-fiber ribbon product according to claim 1, wherein said bonding material is a different color than that of said first-sub-unit matrix material.

3. A splittable optical-fiber ribbon product according to claim 1, wherein the composition of the bonding material is the same as that of the first matrix material.

4. An optical-fiber cable comprising:
   a first splittable optical-fiber ribbon product according to claim 1; and
   a second splittable optical-fiber ribbon product according to claim 1,
   wherein a color of the first sub-unit in the first splittable optical-fiber ribbon product is the same as that of the first sub-unit in the second splittable optical-fiber ribbon product, a color of the second sub-unit in the first splittable optical-fiber ribbon product is the same as that of the second sub-unit in the second optical-fiber ribbon product, and
   a color of the bonding material in the first splittable optical-fiber ribbon product is different from that of the bonding material in the second splittable optical-fiber ribbon product.

5. A splittable optical-fiber ribbon product comprising:
   a first sub-unit comprising a first plurality of optical fibers arranged substantially in a plane and encapsulated in a first matrix material;
   a second sub-unit comprising a second plurality of optical fibers arranged substantially in a plane and encapsulated in a second matrix material;
   said first sub-unit and said second sub-unit being disposed adjacent to one another so that said first plurality of optical fibers and said second plurality of optical fibers lie substantially in one plane;
   bonding material disposed on said first sub-unit and on said second sub-unit so as not to fully encapsulate both of said first sub-unit and said second sub-unit,
   wherein each of said first and second sub-units includes a top surface and a bottom surface substantially parallel to said optical-fiber plane, and said bonding material is disposed on said bottom surfaces, and
   wherein each of said first and second sub-units includes a first end and a second end disposed in the optical-fiber plane so that said second ends of said first and second sub-units are adjacent one another, and said bonding material disposed on at least one of the top and the bottom of said second ends.

6. A splittable optical-fiber product according to claim 5, wherein said bonding material is disposed on at least one of said first ends.

7. A splittable optical-fiber ribbon product according to claim 5, wherein said bonding material is a different color than that of said first-sub-unit matrix material.

8. A splittable optical-fiber ribbon product according to claim 5, wherein the composition of the bonding material is the same as that of the first matrix material.

9. An optical-fiber cable comprising:
a first splittable optical-fiber ribbon product according to claim 5; and
a second splittable optical-fiber ribbon product according to claim 5,
wherein a color of the first sub-unit in the first splittable optical-fiber ribbon product is the same as that of the first sub-unit in the second splittable optical-fiber ribbon product, a color of the second sub-unit in the first splittable optical-fiber ribbon product is the same as that of the second sub-unit in the second optical-fiber ribbon product, and
a color of the bonding material in the first splittable optical-fiber ribbon product is different from that of the bonding material in the second splittable optical-fiber ribbon product.

10. A splittable optical-fiber ribbon product comprising:
a first sub-unit comprising a first plurality of optical fibers arranged substantially in a plane and encapsulated in a first matrix material;
a second sub-unit comprising a second plurality of optical fibers arranged substantially in a plane and encapsulated in a second matrix material;
said first sub-unit and said second sub-unit being disposed adjacent to one another so that said first plurality of optical fibers and said second plurality of optical fibers lie substantially in one plane;
bonding material disposed on said first sub-unit and on said second sub-unit so as not to fully encapsulate both of said first sub-unit and said second sub-unit,
wherein said bonding material, said first matrix material, and said second matrix material are chosen so that the bond between them is strong enough to transfer outward normal forces, applied to the bonding material, to the first or second matrix material.

11. A splittable optical-fiber ribbon product according to claim 10, wherein said bonding material is a different color than that of said first-sub-unit matrix material.

12. A splittable optical-fiber ribbon product according to claim 10, wherein the composition of the bonding material is the same as that of the first matrix material.

13. An optical-fiber cable comprising:
a first splittable optical-fiber ribbon product according to claim 10; and
a second splittable optical-fiber ribbon product according to claim 10,
wherein a color of the first sub-unit in the first splittable optical-fiber ribbon product is the same as that of the first sub-unit in the second splittable optical-fiber ribbon product, a color of the second sub-unit in the first splittable optical-fiber ribbon product is the same as that of the second sub-unit in the second optical-fiber ribbon product, and a color of the bonding material in the first splittable optical-fiber ribbon product is different from that of the bonding material in the second splittable optical-fiber ribbon product.

14. A splittable optical-fiber ribbon product comprising:
a first sub-unit comprising a first plurality of optical fibers arranged substantially in a plane and encapsulated in a first matrix material;
a second sub-unit comprising a second plurality of optical fibers arranged substantially in a plane and encapsulated in a second matrix material;
said first sub-unit and said second sub-unit being disposed adjacent to one another so that said first plurality of optical fibers and said second plurality of optical fibers lie substantially in one plane;
bonding material disposed on said first sub-unit and on said second sub-unit so as not to fully encapsulate both of said first sub-unit and said second sub-unit,
wherein each of said first and second sub-units includes a first end and a second end disposed in the optical-fiber plane so that said second ends of said first and second sub-units are adjacent one another, and said bonding material is disposed only on said first and second ends.

15. A splittable optical-fiber ribbon product according to claim 14, wherein said bonding material is a different color than that of said first-sub-unit matrix material.

16. A splittable optical-fiber ribbon product according to claim 14, wherein the composition of the bonding material is the same as that of the first matrix material.

17. An optical-fiber cable comprising:
a first splittable optical-fiber ribbon product according to claim 14; and
a second splittable optical-fiber ribbon product according to claim 14,
wherein a color of the first sub-unit in the first splittable optical-fiber ribbon product is the same as that of the first sub-unit in the second splittable optical-fiber ribbon product, a color of the second sub-unit in the first splittable optical-fiber ribbon product is the same as that of the second sub-unit in the second optical-fiber ribbon product, and
a color of the bonding material in the first splittable optical-fiber ribbon product is different from that of the bonding material in the second splittable optical-fiber ribbon product.

18. A splittable optical-fiber ribbon product comprising:
a first sub-unit comprising a first plurality of optical fibers arranged substantially in a plane and encapsulated in a first matrix material; and
a second sub-unit comprising a second plurality of optical fibers arranged substantially in a plane and encapsulated in a second matrix material;
said first sub-unit and said second sub-unit being disposed adjacent to one another so that said first plurality of optical fibers and said second plurality of optical fibers lie substantially in one plane; and
bonding material disposed on said first sub-unit and on said second sub-unit so as to connect said first sub-unit and said second sub-unit,
wherein said bonding material, said first matrix material, and said second matrix material are chosen so that the bond between them is strong enough to transfer normal forces, applied to the bonding material, to the first or second matrix material.

19. The splittable optical-fiber ribbon product according to claim 18, wherein said said bonding material, said first matrix material, and said second matrix material further are chosen so as to allow forces applied in opposing directions to said first and second sub-units to be transferred as shearing forces to the bonding material resulting in fracture of the bonding material or failure of the bond between the bonding material and at least one of said first and second subunits without damaging either said first or said second materix material.

* * * * *